(12) United States Patent
Merrill et al.

(10) Patent No.: US 12,151,282 B2
(45) Date of Patent: Nov. 26, 2024

(54) EFFECTIVE LEACHING OF ALUMINA-BASED CASTING CORES

(71) Applicant: Siemens Energy Global GmbH & Co. KG, Munich (DE)

(72) Inventors: Gary B. Merrill, Orlando, FL (US); Stefan Schell, Erlangen (DE); Douglas Bingaman, Orlando, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 185 days.

(21) Appl. No.: 17/770,418

(22) PCT Filed: Oct. 31, 2019

(86) PCT No.: PCT/US2019/059112
§ 371 (c)(1),
(2) Date: Apr. 20, 2022

(87) PCT Pub. No.: WO2021/086373
PCT Pub. Date: May 6, 2021

(65) Prior Publication Data
US 2022/0388056 A1    Dec. 8, 2022

(51) Int. Cl.
*B22C 9/10* (2006.01)
*B22D 27/04* (2006.01)
(Continued)

(52) U.S. Cl.
CPC ............ *B22C 9/10* (2013.01); *B22D 27/045* (2013.01); *B22D 29/002* (2013.01); *B33Y 10/00* (2014.12);
(Continued)

(58) Field of Classification Search
CPC ........ B22C 9/10; B22D 27/045; B22D 29/002
See application file for complete search history.

(56) References Cited

U.S. PATENT DOCUMENTS

| | | |
|---|---|---|
| 4,073,662 A | 2/1978 | Borom |
| 4,108,672 A | 8/1978 | Klug et al. |

(Continued)

FOREIGN PATENT DOCUMENTS

EP     1772210 A2 *    4/2007    ............. B22C 23/00

OTHER PUBLICATIONS

PCT International Search Report and Written Opinion of International Searching Authority mailed May 26, 2020 corresponding to PCT International Application No. PCT/US2019/059112 filed Oct. 31, 2019.

(Continued)

*Primary Examiner* — Kevin P Kerns
*Assistant Examiner* — Steven S Ha
(74) *Attorney, Agent, or Firm* — Wolter Van Dyke Davis, PLLC

(57) ABSTRACT

A ceramic core (40) for an investment casting process (80) including a subsurface internal channel (50) for the introduction of leachate (98) to improve the effectiveness of a leaching process used to remove the core (94) from a cast alloy component (100). The subsurface internal channel may be completely hollow, or it may include one or more ribs (54). The core may be formed (82) using a 3D printing process wherein a carrier material (68) is deposited in a central region of the channel for the purpose of supporting an overlying layer (62) of core material, with the carrier material later being removed to reveal the hollow internal channel (52).

11 Claims, 3 Drawing Sheets

(51) Int. Cl.

| | |
|---|---|
| *B22D 29/00* | (2006.01) |
| *B33Y 10/00* | (2015.01) |
| *B33Y 70/00* | (2020.01) |
| *B33Y 80/00* | (2015.01) |
| *C04B 35/10* | (2006.01) |
| *C04B 41/53* | (2006.01) |
| *C04B 41/91* | (2006.01) |

(52) U.S. Cl.
CPC .............. *B33Y 70/00* (2014.12); *B33Y 80/00* (2014.12); *C04B 35/10* (2013.01); *C04B 41/5353* (2013.01); *C04B 41/91* (2013.01); *C04B 2235/3217* (2013.01)

(56) References Cited

U.S. PATENT DOCUMENTS

| | | |
|---|---|---|
| 4,184,885 A | 1/1980 | Pasco et al. |
| 4,837,187 A | 6/1989 | Frank et al. |
| 5,683,481 A | 11/1997 | Chatterjee et al. |
| 6,494,250 B1 | 12/2002 | Frank et al. |
| 2012/0291983 A1* | 11/2012 | Graham ............... B22D 29/002 164/6 |
| 2015/0306657 A1 | 10/2015 | Frank |
| 2016/0151829 A1 | 6/2016 | Propheter-Hinckley et al. |
| 2016/0184884 A1 | 6/2016 | Slavens et al. |
| 2017/0173675 A1 | 6/2017 | Arnett et al. |

OTHER PUBLICATIONS

Howard Pickard / An Investigation of the Core Removal Process Using Caustic Leaching; Incast Magazine, Jun. 2014.

Yexia Qin and Wei Pan / A Model Alumina Based Investment Casting Ceramic Core Body System, Journal of Materials Science and Engineering with Advanced Technology, vol. 2, No. 1, 2010, pp. 11-25.

Hang Zhang, Zhongliang Lu, Zhe Ji and Dichen Li / Basis for the alkaline removal process design of the alumina-based ceramic core, Journal of the Ceramic Society of Japan, 125 [8] pp. 616-622, 2017.

\* cited by examiner

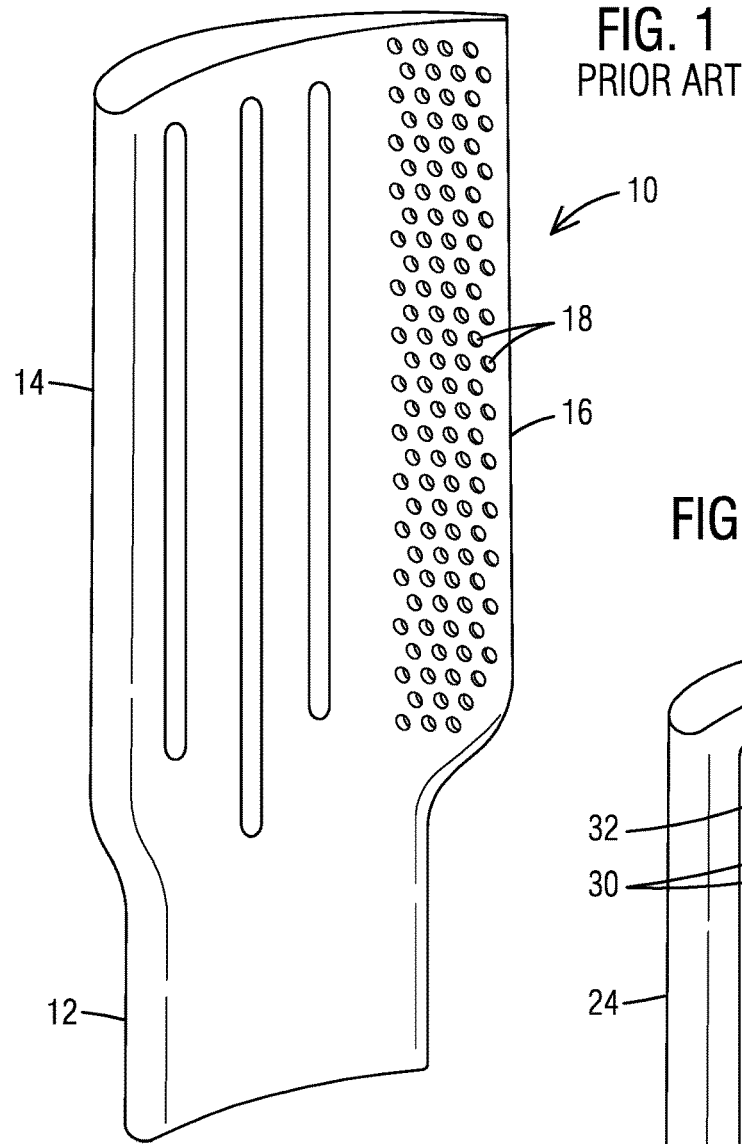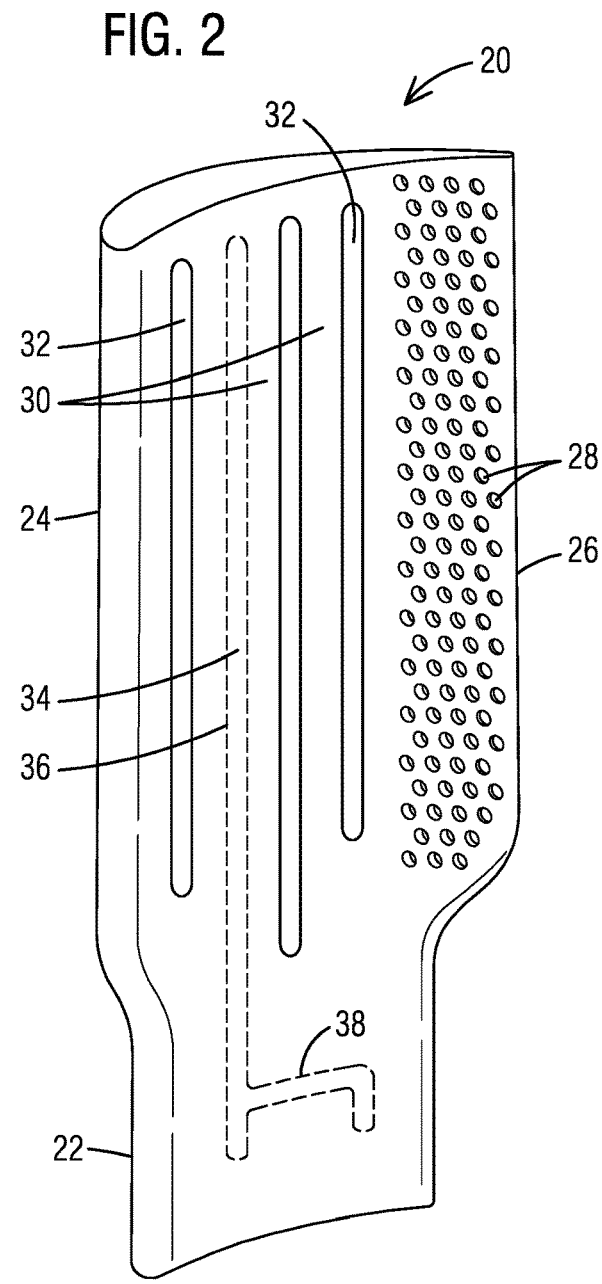

EFFECTIVE LEACHING OF ALUMINA-BASED CASTING CORES

BACKGROUND

1. Field

The present invention relates generally to the field of investment casting, and to methods of casting wherein a ceramic core is removed from an investment cast part using a leaching process, and to a ceramic core having an improved response to a leaching process.

2. Description of the Related Art

Ceramic cores are commonly used in investment casting processes to define internal cavities within cast metal parts. Ceramic cores have traditionally been formed by injecting a ceramic slurry into a core mold, then solidifying and sintering the ceramic material to form the core. The ceramic core is then placed into a component mold that defines the outside surface shape of a desired metal component, and molten metal is solidified around the core within the component mold to form the metal component. The presence of the ceramic core within the component mold results in an internal passage being formed in the component when the molten metal solidifies. Such internal passages are commonly found in gas turbine engine components where they function as cooling passages to conduct cooling fluid for the removal of heat from the component during operation of the component in a hot combustion gas environment. After the cast metal component is removed from the component mold, the ceramic core is removed from the component by a chemical leaching process to reveal the internal cooling passage.

FIG. 1 is a perspective view of a known ceramic core 10 as may be used to define the shape of cooling channels in a later-cast gas turbine engine blade. The core 10 includes a root portion 12 and an airfoil portion 14. The airfoil portion 14 includes a trailing edge region 16 where a plurality of holes 18 in the core 10 define the positions of reinforcing pins to be formed in the later-cast gas turbine engine blade.

Ceramic cores are made from a variety of compositions of materials, including for example silica, zircon and alumina. One such composition is 96% fused silica, 2% zircon and 2% alumina by weight. Silica-based core are commonly used when casting equiaxed alloy gas turbine engine components, and they can be removed from the cast component effectively by known leaching processes. However, as gas turbine designs are pushed toward higher operating temperatures, equiaxed alloys are being replaced by directionally solidified alloys. As used herein, the term directionally solidified alloy includes both multi-crystal directionally solidified (DS) alloys and single crystal (SC) alloys, including high alloy content DS and SC superalloys as are known in the art. These alloys require casting times and temperatures beyond the capability of conventional silica-based cores, mandating the use of high density alumina-based cores. As used herein, the term alumina-based includes compositions having 70% or more by weight alumina.

Because the leaching rate of alumina is substantially lower than that of silica, the industry has recognized substantial difficulties in removing high density alumina-based cores from cast alloy components. Moreover, 3D printing is a relatively new and increasingly popular process for producing ceramic investment casting cores, and most printed cores are alumina-based due to complexities experienced in printing silica-based compositions. 3D printing also facilitates the design of complex core shapes, further exacerbating the problem of removal of an alumina core from a cast metal alloy component by chemical leaching. This problem is a potential roadblock for future developments in core design and investment casting technology.

SUMMARY

To improve the effectiveness of a leaching process used to remove a ceramic core from a cast metallic component, the core is manufactured to include a subsurface internal channel that does not affect the outside surface shape of the core, but that allows a leachate to be delivered through the internal channel during the leaching process. In this manner, the leachate can be applied more fully and more quickly to those portions of the core which were difficult to remove using prior art processes. The internal channel may be completely void and be sized such that it does not adversely impact the strength of the core, or it may contain one or more ribs which span the channel and function to minimize the impact of the channel on the mechanical strength of the core while still allowing leachate to pass through the channel. A core with such a subsurface internal channel may be manufactured using a 3D printing process wherein a shell of ceramic material is deposited around a void central region defining the internal channel. In some embodiments, a fugitive carrier material may be deposited in the central region in lieu of a void to support the deposition of an overlying layer of material, with the fugitive material being removed in a later step of the process.

BRIEF DESCRIPTION OF THE DRAWINGS

The invention is described in more detail with reference to the figures, which illustrate preferred configurations but do not limit the scope of the invention.

FIG. 1 is a perspective view of a prior art ceramic core.

FIG. 2 is a perspective view of a ceramic core in accordance with an embodiment of the invention illustrating a subsurface channel.

DETAILED DESCRIPTION

Figure 3:
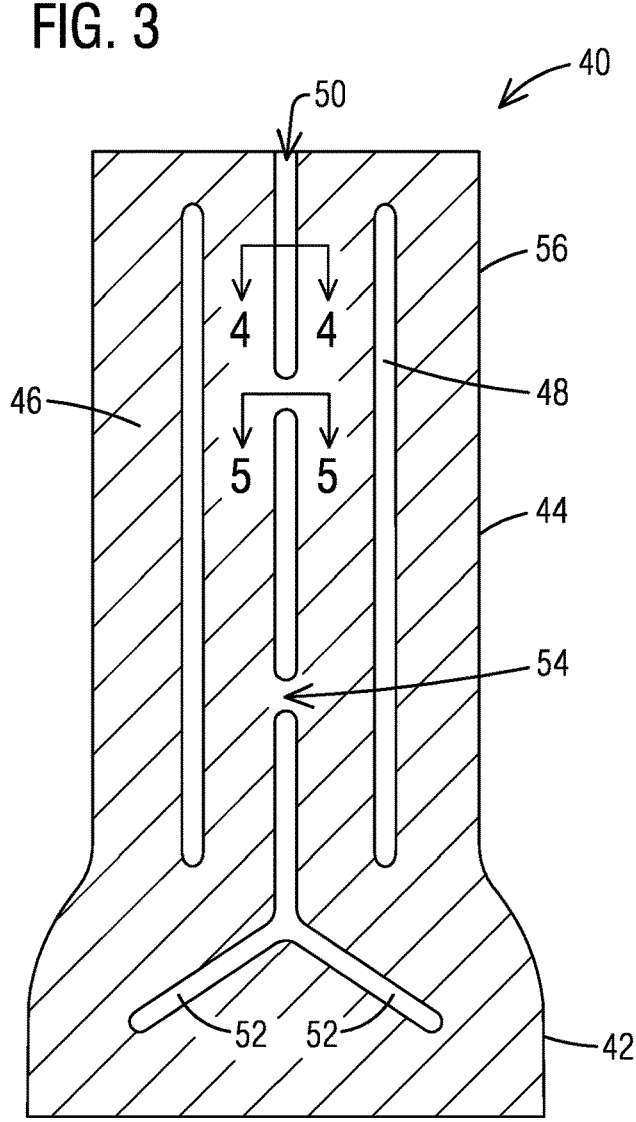
FIG. 3 is a cross-sectional view of a ceramic core in accordance with another embodiment of the invention.

In the following detailed description of the invention, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

FIG. 2 illustrates a ceramic core 20 in accordance with an embodiment of the invention. The core 20 includes a root portion 22 and an airfoil portion 24. The airfoil portion 24 includes a trailing edge region 26 where a plurality of holes 28 in the core 20 define the positions of reinforcing pins to be formed in a later-cast gas turbine engine blade. Solid radially extending regions 30 of the core 20 define the positions of radially extending cooling channels in the later-cast component, and radially extending voids 32 in the core 20 define the positions of radially extending walls separating the cooling channels in the later-cast component. Ceramic core 20 also includes a hollow interior portion defining a hollow internal subsurface channel 34, shown in phantom in FIG. 2. The subsurface channel 34 may have any desired size and shape as may be deemed useful for the delivery of a leachate during a subsequent leaching process when the core 20 is removed from the later-cast component. In the embodiment of FIG. 2, the subsurface channel 34 includes a portion 36 extending radially along a length of one of the radially extending solid regions 30, and a portion 38 extending across the root portion 22 of the core 20. All ends of the channel 34 are closed in the illustrated embodiment, although one may envision other embodiments where one or more ends of a channel are open to the environment outside of the core.

An embodiment of a core with a subsurface channel having an end open to the outside environment is illustrated in FIG. 3, where a ceramic core 40 includes a root portion 42 and an airfoil portion 44, as well as radially extending solid regions 46 and void regions 48 which will define the positions of radially extending cooling passages and walls, respectively, in the later-cast alloy component. The core 40 also includes a subsurface channel 50 extending radially through the airfoil portion 44 and dividing to form two generally horizontal portions 52 extending across the root portion 42. The ends of the horizontal portions 52 are closed, while the end of the channel 50 at the top of the airfoil portion 44 remains open to the external environment. In some embodiments, the open end of the channel 50 may be sealed in a later step.

Figure 4:
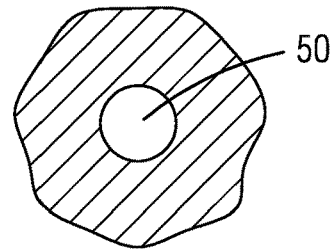
FIG. 4 is a partial sectional view of the core of FIG. 3 taken along section 4-4 showing the cross-sectional shape of the subsurface channel.

Subsurface channel 50 may be formed to have any desired cross-sectional shape, such as a circular shape as may be better appreciated in FIG. 4, which is a cross-section of a portion of the core 40 and channel 50 taken along section 4-4 of FIG. 3. In the region of section 4-4 of FIG. 3, the channel 50 is completely open across its entire circular cross-section.

Figure 5:
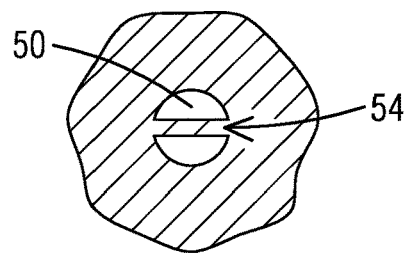
FIG. 5 is a partial sectional view of the core of FIG. 3 taken along section 5-5 showing the shape of a rib reinforcing the subsurface channel.

In contrast to the completely open region of the channel 50, a ceramic core in accordance with an embodiment of the invention may have a rib 54 spanning across the subsurface internal channel 50 at one or more locations along a length of the channel 50, as illustrated in FIG. 5, which is a cross-section of a portion of the core 40 and channel 50 taken along section 5-5 of FIG. 3 at the location of a rib 54. The rib 54 is effective to strengthen the core 40 without blocking flow of leachate through the subsurface internal channel 50 during the subsequent leaching process. The rib 54 may have any desired shape and radial extent.

A ceramic core in accordance with an embodiment of the invention may be formed using any known manufacturing technique, including advantageously using a 3D printing process. 3D printing involves the deposition of material in a series of thin layers representing respective cross-sections of the final component, with the component growing vertically as the layers are stacked one upon another. Core 40 with subsurface internal channel 50 may be defined during a 3D printing process by printing successive layers of a core material, such as an alumina-based material, to form a hollow shell defining the core's outside surface shape 56 at a particular cross-section location, surrounded by a hollow inner region defining the subsurface internal channel 50 shape at that particular cross-section location. When the cross-sectional shape does not change from layer to layer, a second layer of material is printed directly on top of a first layer of material. However, the cross-sectional shape changes in the vertical (radial) direction in regions such as the root 42 of core 40 where the subsurface channel includes a generally horizontally extending section 52. 3D printing of that region in accordance with an embodiment of the invention is described more fully below with reference to FIGS. 6 and 7 below.

Figure 6:
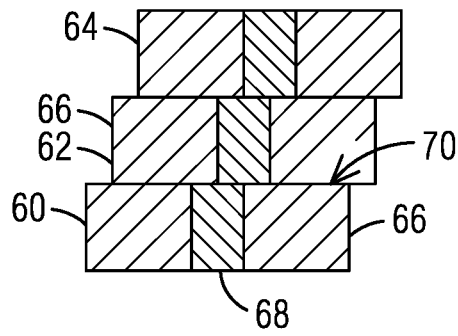
FIG. 6 is a cross-sectional illustration of three layers of a core deposited by a 3D printing process at a stage of manufacturing in accordance with an embodiment of the invention.

FIG. 6 illustrates a portion of the core 40, such as the root 42 of core 40, during a stage of manufacture, showing the printing of three successive cross-sectional layers 60, 62, 64 having a curved or sloping internal subsurface channel 52. Layer 60 is formed by printing a first layer of material to form a hollow shell 66 partially defining the outside surface shape 56 of the core 40 and surrounding an inner region partially defining the subsurface internal channel 52. Then, a carrier material 68 is printed in the inner region, thereby presenting a solid planar surface 70 ready to receive material during the printing of overlying layer 62. Notice that the carrier material 68 in the inner region of the first layer 60 is positioned to at least partially support the material of the shell 66 of the second layer 62. The second layer 62 also includes a shell 66 to further partially define the outside surface shape 56 and an inner region containing carrier material 68 further defining the shape of the subsurface channel 52. This process is repeated for the printing of the third layer 64.

Figure 7:
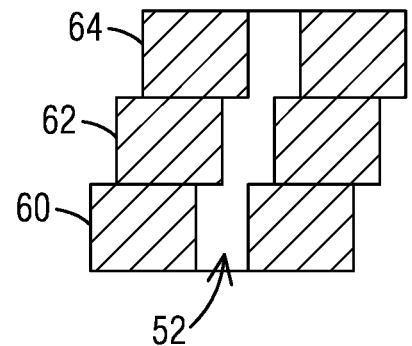
FIG. 7 is a cross-sectional illustration of the three layers of FIG. 6 after the fugitive carrier material has been removed to reveal the subsurface channel.

The carrier material 68 may be a fugitive material such as wax or plastic or any other material capable of supporting the printing of the overlying layer of the core while being removable from the completed core. The carrier material 68 is typically removed prior to the alloy casting process. In the embodiment of FIG. 3, for example, the fugitive material may be evaporated by the application of heat and vented to atmosphere through the open end of the channel 50. If the carrier is an organic material, it may be allowed to decompose during core sintering in a manner that does not damage the core, or it may be removed in a separate step any time prior to introducing leachate into the channel 50. FIG. 7 illustrates the three cross-sectional layers 60, 62, 64 of FIG. 6 after the carrier material 68 has been removed to reveal the hollow internal subsurface channel region 52.

Figure 8:
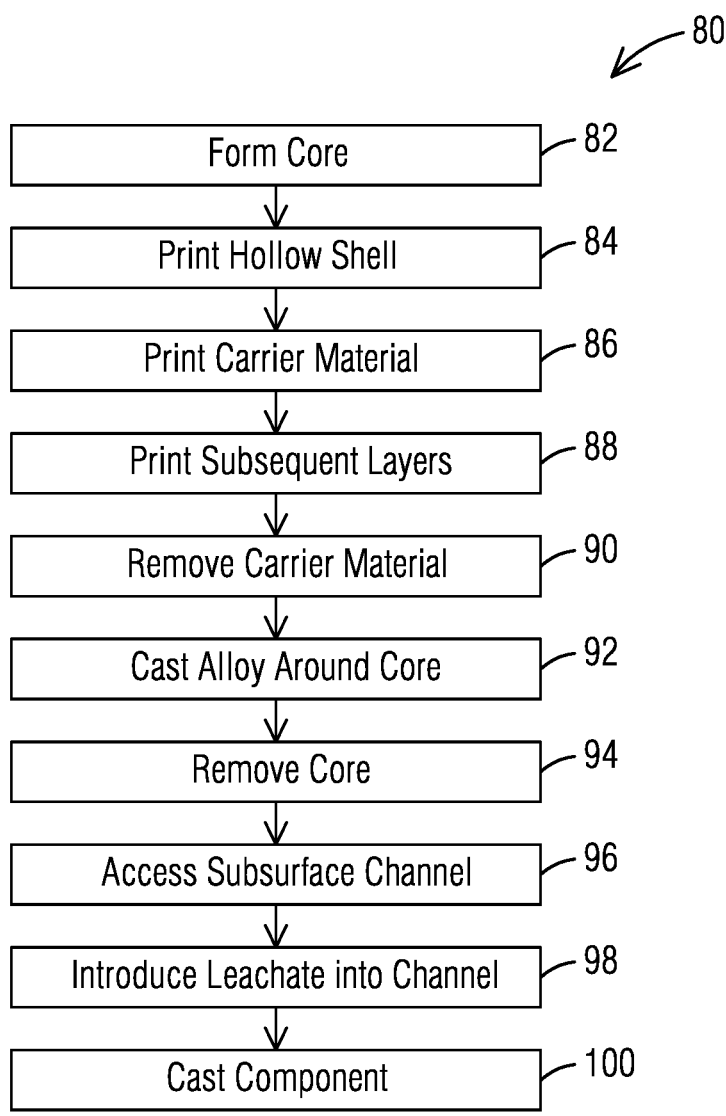
FIG. 8 illustrates steps in a method in accordance with an embodiment of the invention.

FIG. 8 illustrates steps in method 80 according to embodiments of the invention. A core is formed at step 82 to include a hollow subsurface channel, such as by 3D printing an alumina-based material to form a shell region around a central region at step 84, printing a carrier material in the central region if required at step 86, printing subsequent layers to form the desired core shape at step 88, and removing the carrier material at step 90 if required. A metal alloy component is then formed at step 92 by directionally solidifying molten metal around the core in a component mold. The core is then removed from the cast component using a leaching process to reveal the internal cooling passage at step 94. Access to the internal cooling passage is obtained at step 96, either by using a mechanical process such as drilling or grinding or by allowing the leaching process to progress to a point where an end of the subsurface channel is exposed to the leachate. Leachate is then introduced into the subsurface channel at step 98, thereby guiding the leachate into hard-to-remove regions of the core to improve the effectiveness of the leaching process. Upon full removal of the core, the final cast metal component is revealed at step 100.

What is claimed is:

1. A method of casting a directionally solidified gas turbine engine component having an internal cooling passage, the method including
    using a 3D printing process to form an alumina-based core having an outside surface shape defining a shape of the cooling passage,
    directionally solidifying molten metal around the core in a mold to form the component, and
    using a leaching process to remove the core from the component to reveal the internal cooling passage,
    the method characterized by:
        forming the core by printing successive layers of alumina-based material to include a subsurface internal channel, with a shape of the subsurface internal channel being defined by a carrier material within the subsurface internal channel, with the step of forming comprising:
            printing a first layer of alumina-based material to form a hollow shell partially defining the outside surface shape and surrounding an inner region partially defining the subsurface internal channel,
            printing the carrier material in the inner region, the carrier material in the inner region positioned to at least partially support a second layer of alumina-based material printed over the first layer of alumina-based material to further partially define the outside surface shape, and
            allowing the carrier material to remain in the inner region during the step of directionally solidifying molten metal around the core, and
        introducing leachate into the subsurface internal channel during the leaching process after removal of the carrier material.

2. The method of claim 1, further characterized by
    printing the core to include at least one rib spanning the subsurface internal channel, the at least one rib effective to strengthen the core without blocking flow of the leachate through the subsurface internal channel.

3. The method of claim 1, further characterized by:
    printing the core such that the subsurface internal channel has closed ends; and opening an end of the subsurface internal channel after the step of directionally solidifying molten metal around the core to provide access for introducing the leachate into the subsurface internal channel.

4. The method of claim 3, further characterized by the end of the subsurface internal channel being opened by the leachate during the leaching process.

5. A method of casting a metal component, the method comprising:
    forming a ceramic core by depositing successive layers of material to include a hollow subsurface interior channel, with a shape of the hollow subsurface interior channel being defined by a carrier material within the hollow subsurface interior channel;
    casting the metal component around the ceramic core and allowing the carrier material to remain in the hollow subsurface inner channel during a step of directionally solidifying molten metal around the ceramic core; and
    removing the ceramic core from the cast metal component using a leaching process wherein a leachate is introduced into the hollow subsurface interior channel after removal of the carrier material.

6. The method of claim 5, further comprising
    forming the ceramic core using a 3D printing process.

7. The method of claim 6, wherein the step of forming comprises:
    depositing layers of an alumina-based material to form the successive layers of material of the ceramic core during the 3D printing process.

8. The method of claim 5, wherein the step of forming comprises:
    depositing a first layer of alumina-based material to define a first layer of the successive layers of material, the first layer having a shell region surrounding a central region;
    depositing a first layer of the carrier material different from the alumina-based material in the central region; and
    depositing a second layer of the alumina-based material of the successive layers of material over at least a portion of the first layer of alumina-based material and over at least a portion of the first layer of the carrier material, the at least a portion of the first layer of the carrier material providing mechanical support for the deposition of the second layer of the alumina-based material.

9. The method of claim 5, further comprising
    printing the ceramic core to include at least one rib spanning the hollow subsurface interior channel, the at least one rib effective to strengthen the core without blocking leachate flow through the hollow subsurface interior channel.

10. The method of claim 5, further comprising:
    forming the hollow subsurface interior channel to have closed ends; and
    opening an end of the hollow subsurface interior channel after the casting step to provide access for introducing the leachate into the hollow subsurface interior channel.

11. The method of claim 10,
    wherein the end of the hollow subsurface interior channel is opened by the leachate during the leaching process.

* * * * *